United States Patent
So et al.

(10) Patent No.: US 8,833,309 B2
(45) Date of Patent: Sep. 16, 2014

(54) REMOTE ANIMAL TRAINING SYSTEM USING VOLTAGE-TO-FREQUENCY CONVERSION

(75) Inventors: Hosung So, Torrance, CA (US); Bongki Min, Gyeonggi-do (KR)

(73) Assignee: E-Collar Technologies, Inc., Garrett, IN (US)

( * ) Notice: Subject to any disclaimer, the term of this patent is extended or adjusted under 35 U.S.C. 154(b) by 376 days.

(21) Appl. No.: 13/242,293

(22) Filed: Sep. 23, 2011

(65) Prior Publication Data

US 2012/0160183 A1 Jun. 28, 2012

Related U.S. Application Data

(63) Continuation-in-part of application No. 12/976,987, filed on Dec. 22, 2010.

(51) Int. Cl.
*A01K 15/00* (2006.01)
*A01K 15/02* (2006.01)

(52) U.S. Cl.
CPC .................................. *A01K 15/021* (2013.01)
USPC .......................................... 119/720; 119/712

(58) Field of Classification Search
USPC ................. 119/718–720; 340/573.3
See application file for complete search history.

(56) References Cited

U.S. PATENT DOCUMENTS

| | | | |
|---|---|---|---|
| 4,199,921 A | 4/1980 | Watkins | |
| 4,335,682 A * | 6/1982 | Gonda et al. | 119/719 |
| 4,802,482 A | 2/1989 | Gonda et al. | |
| 5,054,428 A | 10/1991 | Farkus | |
| 5,353,744 A | 10/1994 | Custer | |
| 5,465,687 A | 11/1995 | Custer | |
| 5,559,498 A | 9/1996 | Westrick et al. | |
| 5,605,116 A | 2/1997 | Kim et al. | |
| 5,666,908 A | 9/1997 | So | |
| 5,815,077 A * | 9/1998 | Christiansen | 340/573.3 |
| 5,857,433 A | 1/1999 | Files | |
| 5,913,284 A | 6/1999 | Van Curen et al. | |
| 6,019,066 A | 2/2000 | Taylor | |
| 6,073,589 A | 6/2000 | Curen et al. | |
| 6,131,535 A | 10/2000 | So | |
| 6,135,060 A | 10/2000 | So | |
| 6,167,843 B1 * | 1/2001 | Kim | 119/720 |
| 6,170,439 B1 | 1/2001 | Duncan et al. | |
| 6,474,269 B2 | 11/2002 | So | |
| 6,549,133 B2 | 4/2003 | Duncan et al. | |
| 6,598,563 B2 | 7/2003 | Kim et al. | |
| 6,637,376 B2 | 10/2003 | Lee, IV | |
| 6,725,810 B2 | 4/2004 | Schwartz | |
| 6,860,240 B2 | 3/2005 | Kim et al. | |
| 7,017,524 B2 | 3/2006 | Gillis et al. | |
| 7,111,586 B2 | 9/2006 | Lee et al. | |

(Continued)

*Primary Examiner* — Kristen C Hayes
(74) *Attorney, Agent, or Firm* — Taylor IP, P.C.

(57) ABSTRACT

An animal training device and system which uses a voltage to frequency conversion technology (VFC) providing the capability to adjust in gradual incremental levels upward and downward for consistent and individual electronic control of separate output to an animal undergoing training to learn new behaviors. Whether one-way or two-way remote controller with manual activation by the user, automatic activation by remote sensor detectors, or automatically activated by an on-board microprocessor circuitry sensing the animals own actions, either or all device outputs allow the animal's caretaker the unique capability to select an appropriate level of one of a variety of cue signals at a given moment allowing the animal not to be overwhelmed or to cause any over-reactions.

8 Claims, 10 Drawing Sheets

(56) References Cited

U.S. PATENT DOCUMENTS

| | | |
|---|---|---|
| RE39,931 E | 12/2007 | So |
| 7,607,406 B2 * | 10/2009 | So ............................... 119/719 |
| 7,845,311 B2 * | 12/2010 | So ............................... 119/720 |
| 8,181,607 B2 | 5/2012 | Kim |
| 8,477,037 B2 * | 7/2013 | So ............................. 340/573.3 |
| 8,552,872 B2 * | 10/2013 | So ............................. 340/573.3 |
| 2007/0221138 A1 | 9/2007 | Mainini et al. |
| 2010/0139575 A1 * | 6/2010 | Duncan et al. ................ 119/712 |
| 2012/0160181 A1 * | 6/2012 | So ............................... 119/720 |
| 2012/0160182 A1 * | 6/2012 | So et al. ........................ 119/720 |
| 2012/0160183 A1 * | 6/2012 | So et al. ........................ 119/720 |
| 2013/0112153 A1 * | 5/2013 | So et al. ........................ 119/720 |

* cited by examiner

REMOTE ANIMAL TRAINING SYSTEM USING VOLTAGE-TO-FREQUENCY CONVERSION

CROSS REFERENCE

This application is a continuation-in-part of application Ser. No. 12/976,987 filed on Dec. 22, 2010.

BACKGROUND OF THE INVENTION

The field of the present invention is remote training devices for animals.

In the training of animals since the late 1960's, owners/handlers/trainers (hereinafter "user") have employed various electronic techniques and technologies to encourage and/or discourage an animal's actions. From this, an animal can learn desired behaviors. These electronic aides, whether remotely controlled by the user, manually controlled by sensor inputs or automatically controlled by the animal's own actions, have advanced throughout the years to gain prominence in today's electronic world.

Different kinds of electronic cue signals have been employed using varying degrees, or levels, of sounds, vibrations, and electrical impulses. With these tools and through experience gained through the years, focus has been on making these cue signals fit specific events while improving the animal's acceptance in learning its tasks more easily. This experience has been predominately been with dogs; although the application of such devices are not specifically limited only to dogs.

During this evolution, manufacturers offered users the capability to select different levels of cue signals at a given moment from a hand-held transmitter to the dog's collar at a distance and from one to over one hundred different levels. From this vantage, what has been learned is that one level is not always the appropriate level. Rather, many levels are useful and depend upon the temperament and distraction level of each individual dog at any given moment. It is advantageous to have the means to quickly adjust the level to match the dog's current focus. Yet, even a selector dial with many levels to select from may not be enough as the available levels may not properly match the dog's adrenal releases and distractions.

Therefore a device was needed which provides incremental gradual levels that can be quickly adjusted just as the volume control in ones car radio—fitting the individual's hearing quality while overcoming background noise levels. In this manner, the device's output needs to finitely change to match the dog's adrenaline and background distractions at any given moment and at appropriate distances. Not only to go up in level but to instantly come down in level, therein never overwhelming the dog or causing any over reactions by the dog.

SUMMARY OF THE INVENTION

The present invention is directed to a remote controller for animal training including a remote controller held by a user and a training device worn by an animal coupled by radio frequency (RF) communication. The remote controller has a stimulation mode selection button, a control for setting the level of electrical impulse stimulation to be applied to the animal which includes a three-terminal potentiometer for volume control. A voltage-to-frequency converter converts a voltage level set by the volume control to a corresponding frequency signal proportional to the voltage level. RF communication circuitry transmits signals including the kind and mode of stimuli and the level of electrical impulse stimulation to the training device through a transmitting antenna.

Additional features are selectively contemplated including a buzzer and an LED on the training device controlled by the remote controller. Battery charge status of the power sources on the two devices are contemplated for the remote controller. A GPS locator and a detachable antenna are also contemplated.

Therefore, it is an object of the present invention to provide an improved animal training device. Other and further objects and advantages will become apparent from the following description.

DETAILED DESCRIPTION OF THE PREFERRED EMBODIMENTS

A remote controller for animal training includes a user hand-held transmitter for transmitting coded command signals. The command signals are transmitted via a microprocessor amplified through a RF system and outputted through an antenna. The remote controller further includes a training device worn by the animal to be trained. An RF receiver receives command signals with individual output levels of three different styles of stimuli to the sensory system of the animal in order to allow the animal to properly react or respond to these levels of stimuli.

A hand-held transmitter uses a voltage frequency converter (VFC) for converting input from a three-terminal potentiometer voltage to a frequency proportional thereto. The frequency signal is input to a microprocessor. The microprocessor has a security code function to limit control of the training device to that of the remote controller. Five function switches allow for the selection of one of five types of stimulation, 1) brief electrical impulse stimulation, 2) continuous electrical impulse stimulation, 3) boost continuous electrical impulse stimulation, at a preset level above the continuous stimulation setting, 4) magnetic buzzer stimulation, and 5) light stimulation. The switches are connected to the RF circuitry to produce and amplify signals denoting the selected stimulation then delivered to an antenna driver and in turn to a tuned broadcast antenna.

An animal collar receiver receives the RF transmitted coded signals from the transmitter. A detector circuit detects the coded signals and send them to an on-board microprocessor. The microprocessor converts the coded signals and activates one of five driver circuits for then outputting the selected stimuli and the appropriate level to the animal. The same RF circuitry on both the remote controller and the training device can function as paired transceivers to broadcast intelligent data back to the hand-held transmitter.

A stimulator adjustment control includes a voltage divider network with a three-terminal potentiometer. The potentiometer is coupled to a voltage to frequency converter circuit (VFC) which converts the voltage level into individual separate frequencies. These separate frequencies allow the microprocessor to send the appropriate signal to the individual stimuli drivers for the five different outputs at the animal collar to articulate many different gradual levels of output from each of the five individually selectable stimuli.

Both the transmitter and receiver employee a DC battery pack for operating each system through an on-board regulator and power switch. In one embodiment, rechargeable batteries and their charging circuits are installed.

On/off power switches are provided in each the transmitter and the receiver to activate and deactivate each system independently. In one embodiment, an LCD screen is employed in the transmitter and offers the user the capability to observe in a visual display the level setting, the state of the transmitter battery and which one of the five select function buttons is powered up when that particular button is pressed, preferably by icon.

With the capability to adjust gradual levels upward and downward while also providing different styles of stimulation, the control offers the animal opportunities to be successful while allowing the user to build a more meaningful relationship with the animal. To allow greater potential for successful training results, these sensory detectors and their drive circuitry would include utilizing optical, photo, infrared, air flow, vibration, tilt, pressure, reflective, magnetic, temperature, voltage, current, frequency, and percussion transducer/sensors of all sorts and kinds.

Such electronic control activations would include utilizing the following signal types as cues:

Sound—audible, ultrasonic, and subsonic created by mechanical speaker/microphone, relay buzzer, solid-state, piezoelectric, ceramic, ferrite, magnetic, condenser, and percussion (utilizing all frequencies, pulse rates, duty cycles, pulse widths, amplitudes, duration, repetition rates and such.)

Light—all spectrum colors, brilliances, and such (utilizing all frequencies, pulse rates, duty cycles, pulse widths, amplitudes, duration, repetition rates and such.)

Taste—sweet to poison.

Smell—pungent to flowery.

Electrical impulse—Transformer control of low current (50 micro-amps to 100 milliamps) with high-voltage (50 VAC to 10,000 VAC) (utilizing all frequencies, pulse rates, duty cycles, pulse widths, amplitudes, duration, repetition rates and such.)

Vibration—motor-drive, mechanical offset fulcrum, pancake, ceramic, percussion and transducer (utilizing all frequencies, pulse rates, duty cycles, pulse widths, amplitudes, duration, repetition rates and such.)

Figure 2:
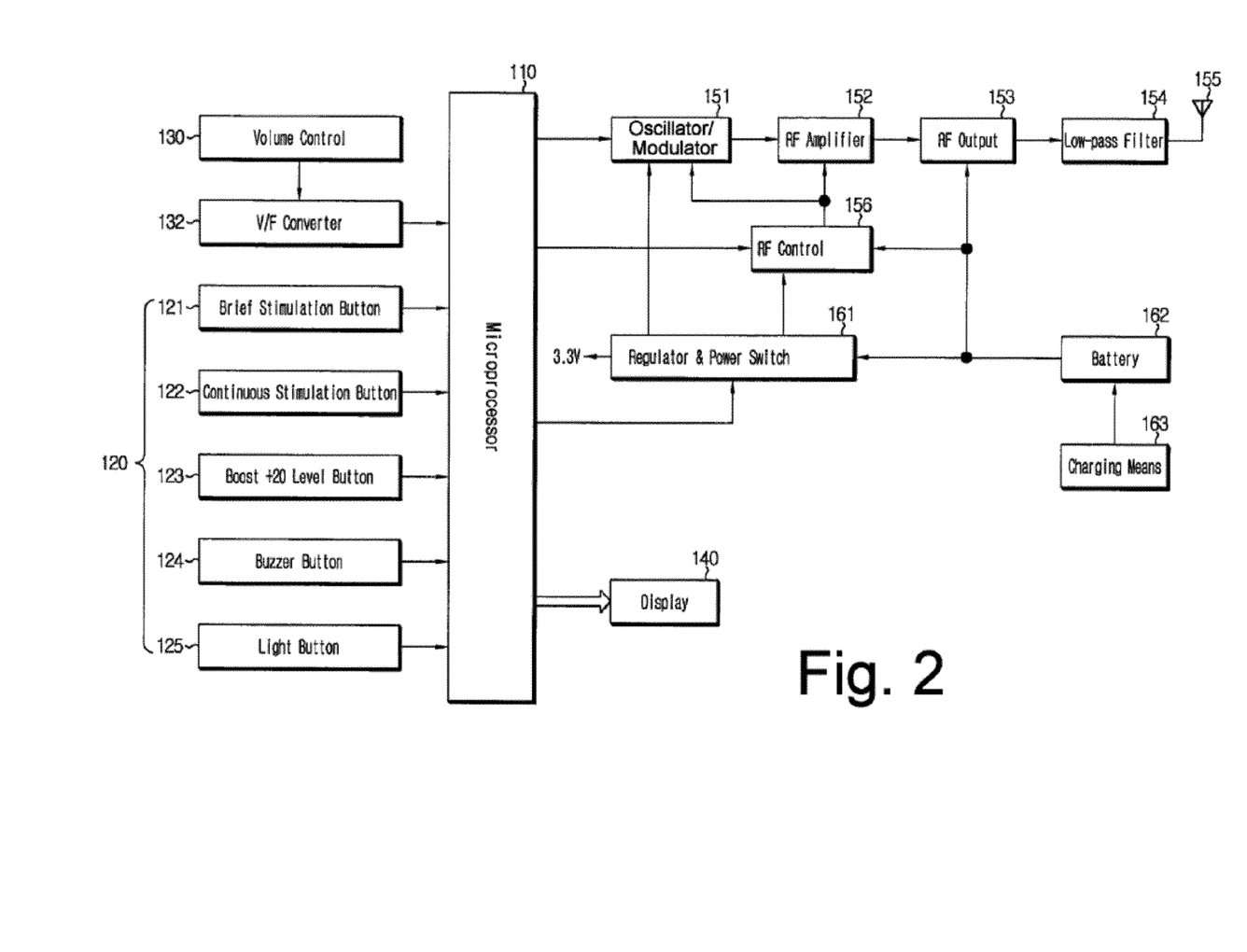
FIG. 2 is a block diagram showing the remote controller circuitry according to a first embodiment.
Figure 4:
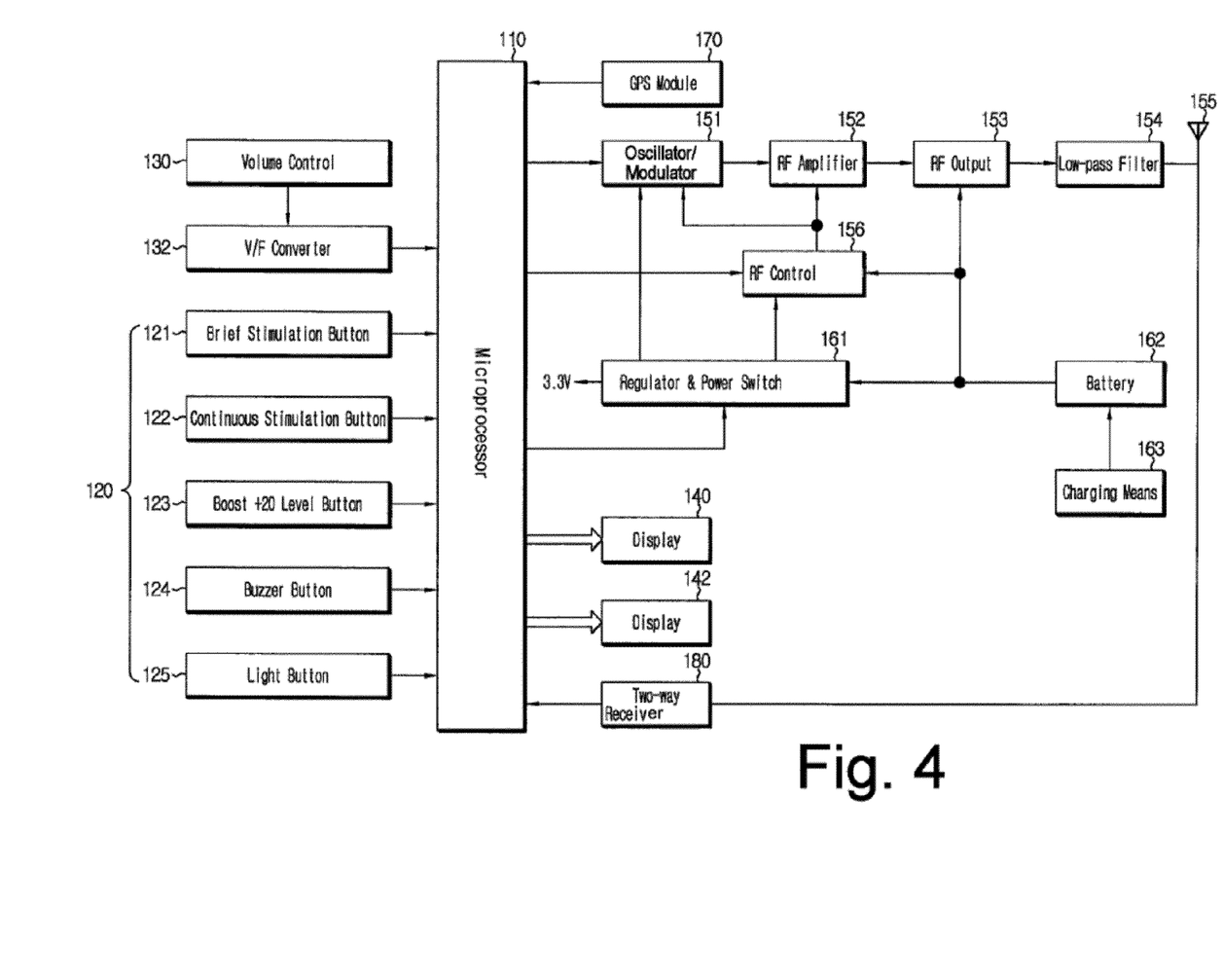
FIG. 4 is a block diagram showing the remote controller circuitry according to a second embodiment.

Looking more specifically to the figures, FIGS. 2 and 4 depict a hand-held remote controller 100. If any one of first to fifth function buttons (switches) of the remote controller is pressed, corresponding data and ID codes set by an ID code setting means are provided to an oscillator/modulator 151. Then, RF signals generated in the oscillator/modulator 151 are amplified at an RF amplifier 152 and an RF output terminal 153, filtered at a low-pass filter 154 to remove harmonics, and then emitted through an antenna 155 as radio waves.

A stimulation adjustment control 130 uses a potentiometer as a "volume" (magnitude) control which allows precise control or gradual change of the stimulation level suitably for an animal, differently from the prior art. A conventional stimulation adjustment means uses a mechanical selector switch, and such a selector switch cannot subdivide a stimulation level precisely.

Figure 3:
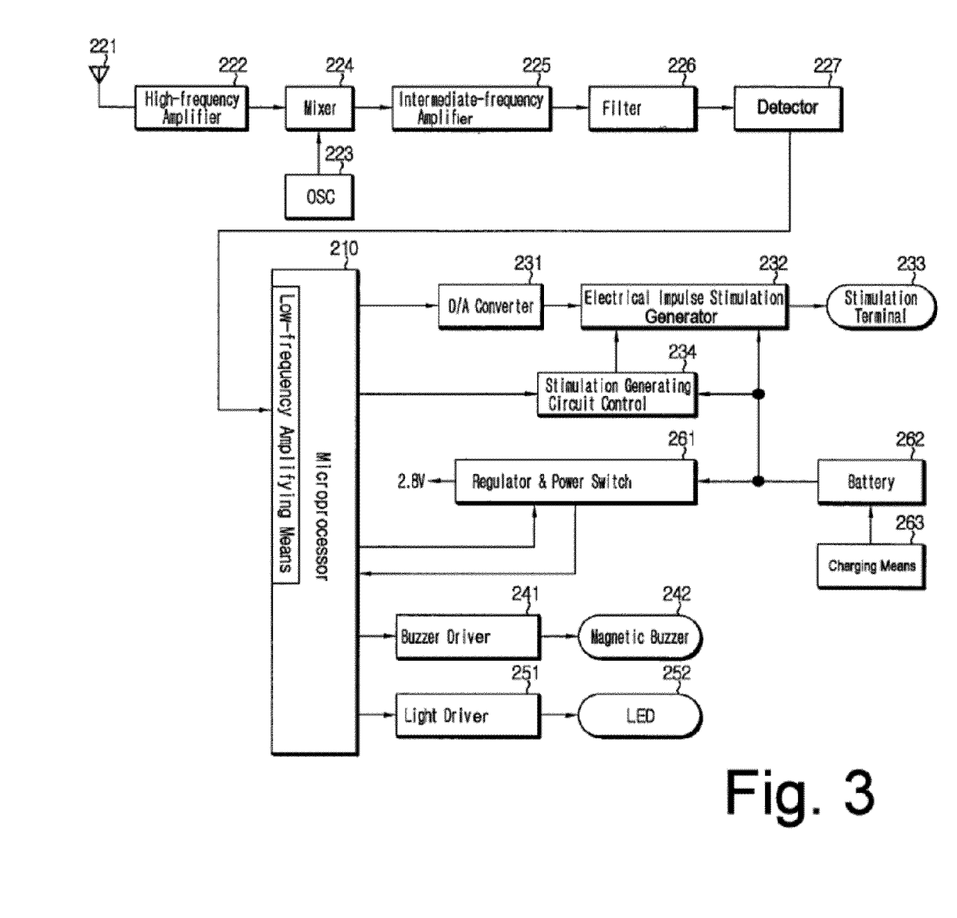
FIG. 3 is a block diagram showing the training device according to the first embodiment.
Figure 5:
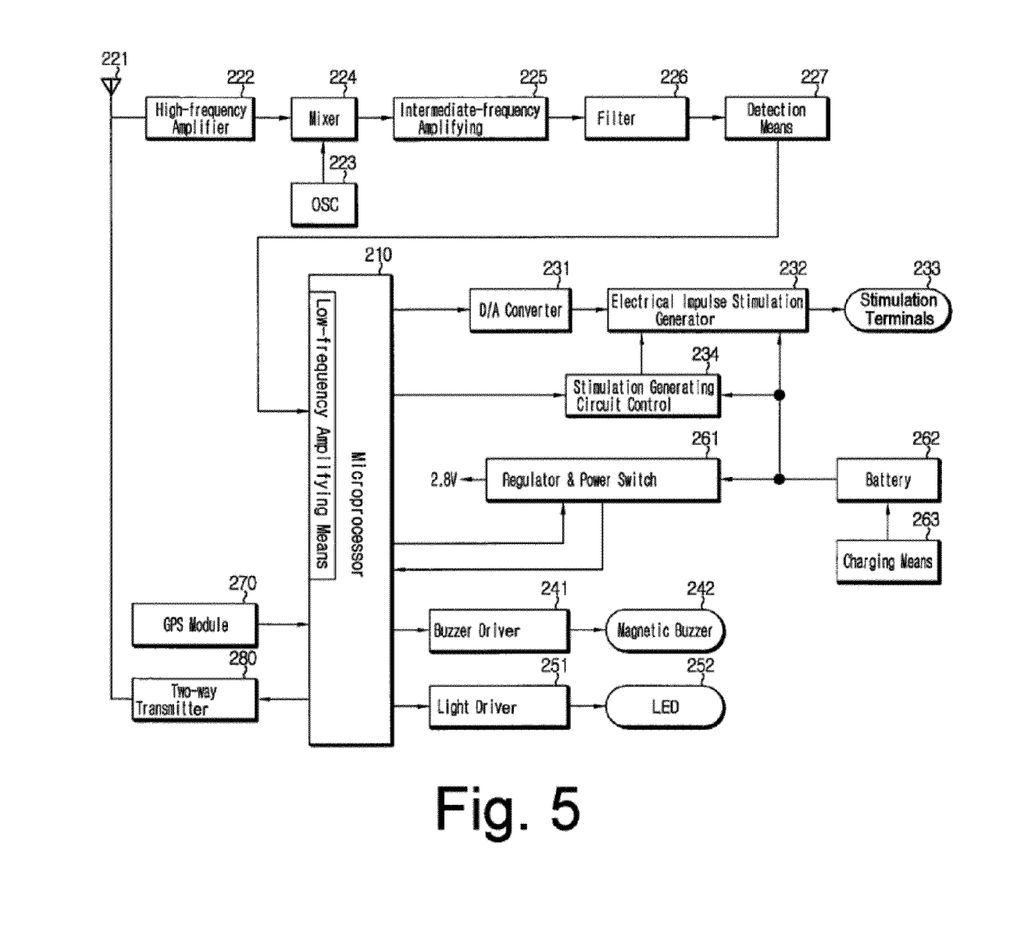
FIG. 5 is a block diagram showing the training device according to the second embodiment.

FIGS. 3 and 5 depict a training device 200. The training device 200 receives the RF signals emitted in the transmission of the remote controller 100 of FIGS. 2 and 4 respectively through an antenna 221 included therein. Then, a high-frequency amplifier 222 amplifies weak radio waves, and a mixer 224 makes a secondary intermediate frequency such that a detector 227 extracts the data sent from the transmitter via a filter 226. The extracted data is input to a low-frequency amplifier included in a microprocessor 210. The microprocessor 210 outputs a signal to a selected one of an electrical impulse stimulation generator if the ID code contained in itself is identical to the ID code sent from the transmitter.

Hereinafter, each component of the remote controller (transmitter) 100 and the training device (receiver) 200 shown in FIGS. 2 to 5 will be described in detail based on the first and second embodiments. In the following description, if "the second embodiment" is mentioned, the corresponding description will apply only to the second embodiment. However, the following description will apply to both the first and second embodiments unless otherwise specifically stated.

REFERENCE SYMBOLS

FIGS. 2 and 4—Remote Controller 100

120: Buttons (or, switches)
121: Brief stimulation button (first function button)
Brief low-frequency electrical impulse stimulation (3 to 5 pulses) is generated at the training device regardless of the time during which the button of the remote controller is pressed.
122: Continuous stimulation button (second function button)
Continuous low-frequency electrical impulse stimulation is generated at the training device during the time that the button of the remote controller is pressed (12 seconds at the maximum).
123: +20 level boost continuous stimulation button (third function button)
Boost low-frequency electrical impulse stimulation is preset at 20 levels higher than the continuous impulse level and is generated at the training device during the time that the button of the remote controller is pressed (5 to 7 seconds at the maximum).
124: Buzzer button (fourth function button)
A brief buzz sound is generated at the training device (3 to 5 pulses) regardless of the time during which the button of the remote controller is pressed.
125: Light button (fifth function button)
An LED light at the training device is turned on at the first press and turned off at the second press regardless of the time between when the button of the remote controller is pressed.

130: Volume Control

The volume control is used for adjusting the stimulation level of the training device. A low-frequency electrical impulse stimulation corresponding to the level set by the volume control is generated at the training device by means of the first, second and third function buttons.

132: V/F Converter

An analog voltage according to the level output from the volume control 130 is converted into frequency, which is a digital value recognizable by a microprocessor in the remote controller, and then transmitted to the microprocessor in the training device. For example, 20 Hz signal is provided to the microprocessor in case a volume output voltage is 0.1 V (i.e. level 1), and 100 Hz signal is provided to the microprocessor in case a volume output voltage is 0.5V (i.e. level 5).

110: Microprocessor

The microprocessor controls all functions input from the function buttons 120 and outputs an ID code signal. The microprocessor also has a power ON/OFF function.

The microprocessor recognizes and processes the frequency signal supplied according to a stimulation level operates a display 140 and operates a RF control 156, which controls an RF oscillator 151 and an RF amplifier 152 when a function is operated. In the two-way system (in the second embodiment), the microprocessor processes the data received from the training device 200. For instance, the microprocessor computes a distance between a user and an animal based on position data of the user and the animal.

140, 142: Display

The level set by the volume control 130, and a residual battery capacity of the remote controller is displayed. In the two-way system (in the second embodiment), a residual battery capacity of the training device, a direction and distance of an animal from the user, a moving speed of the animal, and so on are displayed on the display 142.

151: Oscillator//Modulator

The remote controller uses FM (Frequency Modulation), and a modulation-allowable VCXO is applied to give RF oscillation and modulation at the same time.

152: RF Amplifier

RF output from the oscillator and modulator 151 is low, so the RF amplifier amplifies the output RF such that a following output terminal can be operated.

153: RF Output

The RF output is for amplifying RF such that the remote controller and the training device are within a reachable distance.

154: Low-pass Filter

The low-pass filter blocks high frequencies in the RF signal other than fundamental waves.

155: Antenna

The antenna transmits RF composed of fundamental waves, which has passed through the low-pass filter 154. In the two-way system (in the second embodiment), the antenna receives RF signal transmitted from the training device.

156: RF Control

When any one of the first to fifth button 121~125 of the remote controller is pressed, the RF control supplies power to the oscillator/modulator 151 and the RF amplifier 152 such that the oscillator/modulator 151 and the RF amplifier 152 are operated.

161: Regulator & Power Switch

The regulator & power switch has a constant-voltage IC function that is operated in association with the microprocessor 110. If the power switch of the remote controller is pressed over 0.5 second, the power is turned on. If the power switch is pressed for over 1 second again after the power is turned on, the power is turned off.

162: Battery

A rechargeable battery, is adopted.

163: Charging Device

The battery 162 is a rechargeable battery and thus the charging device is used.

170: GPS Module (in the second embodiment)

The GPS module 170 receives signals from the GPS of the training device 200 to provide the microprocessor 110 with position data of the trainer.

180: Two-way Receiver (in the second embodiment)

The two-way receiver 180 is used for receiving the information of the training device, and the two-way receiver 180 gives data to the microprocessor 110.

REFERENCE SYMBOLS

FIGS. 3 and 5—Training Device 200

221: Antenna

The antenna receives RF signal transmitted from the remote controller 100. In the two-way system (in the second embodiment), the antenna transmits RF signal to the remote controller 100. It is preferable that the antenna 221 is an internal (built-in) antenna and a detachable external antenna 221' (see FIG. 1) is further provided to extend a reachable distance.

222: High-frequency Amplifier

The high-frequency amplifier amplifies weak RF signals induced to the receiving antenna 221.

223: OSC

OSC is an oscillator that oscillates in itself to give a secondary intermediate frequency.

224: Mixer

RF signal supplied from the high-frequency amplifier 222 is mixed with the signal supplied from the OSC 223 to make an intermediate frequency that is a secondary frequency.

225: Intermediate-frequency Amplifier

The intermediate-frequency amplifier amplifies the intermediate frequencies made at the mixer 224.

226: Filter

The filter filters the intermediate frequencies made at the mixer 224 to remove noise.

227: Detector

The detector detects function signals and ID signals sent from the remote controller.

210: Microprocessor

A low-frequency amplifier included in the microprocessor amplifies analog signals detected by the detector 227; and, in case the received signal is identical to ID code already stored, a signal of any one selected from the first to fifth button 121~125 of the remote controller is output. In the two-way system (in the second embodiment), the microprocessor processes the information of the training device and gives the information to a two-way transmitter 280.

231: D/A Converter
The D/A converter is used for outputting a stimulation level, set by the volume control of the remote controller, as analog signals.

232: Electrical Impulse Stimulation Generator
The electrical impulse stimulation generator generates high-voltage stimulations to give low-frequency electrical impulse stimulations to an animal utilizing a transformer output.

233: Stimulation Terminals
The stimulation terminals are electrodes for supplying electrical impulse stimulation to an animal.

234: Stimulation Generating Circuit Control
When the first, second and third function button 121~123 of the remote controller are pressed, the stimulation generating circuit control 234 supplies power to the electrical impulse stimulation generator 232 to operate the electrical impulse stimulation generator 232.

241: Buzzer Driver
The buzzer driver is used for operating a magnetic buzzer when the fourth function button 124 of the remote controller is pressed.

242: Magnetic Buzzer
The magnetic buzzer 242 is used for converting electric signals into sound signals.

251: Light Driver
The light driver 251 is used for operating at least one LED light when the fifth function button 125 of the remote controller is pressed.

252: LED
Two high-brightness LED's 252 are applied to convert electric signals into light signals.

261: Regulator & Power Switch
The regulator & power switch 261 has a constant-voltage IC function that is operated in association with the microprocessor 210. If the magnet is contacted with the lead switch of the training device over 0.5 second, the power is turned on. If the magnet is contacted over 0.5 second again after the power is turned on, the power is turned off.

262: Battery
A rechargeable battery, is adopted.

263: Charging Means
The battery 262 is a rechargeable battery and thus the charging means 263 is used.

270: GPS (in the second embodiment)
The GPS (Global Positioning System) 270 obtains reference signals from at least three satellites to provide the microprocessor 210 with position data of the animal.

280: Two-way Transmitter (in the second embodiment)
The two-way transmitter 280 is used for transmitting the information of the training device, and the two-way transmitting 280 emits data as radio waves.

Meanwhile, in the former embodiments, the training device 200 includes the D/A converter 231 for converting the set stimulation level to an analog signal capable of being processed by the electrical impulse stimulation generator 232 and then outputting the analog signal. The D/A converter may be implemented in various ways, but generally the D/A converter is connected to the number of output pins of the microprocessor 210 which corresponds to the number of the stimulation level. In other words, though it is depicted in FIGS. 3 and 5 that the D/A converter 231 is connected to the microprocessor 210 by one line, for example in the case where the number of the stimulation level is 256 ($=2^8$), the D/A converter 231 is connected to eight output pins of the microprocessor 210. Therefore, there is a disadvantage in that the capacity and size of the microprocessor generally configured with ASIC increases.

In order to solve this disadvantage, U.S. Pat. No. 5,666,908 and U.S. Pat. No. 6,637,376 teach or suggest a configuration not using a D/A converter. In other words, in U.S. Pat. No. 5,666,908 and U.S. Pat. No. 6,637,376, a microprocessor outputting a digital value outputs a pulse train corresponding to a stimulation level (intensity), and the pulse train is intactly applied (strictly, through a buffer) to a transistor which controls a primary current of a transformer serving as an electrical impulse stimulation generator. In detail, in U.S. Pat. No. 5,666,908, the microprocessor generates a pulse train in which a pulse width is changed in proportion to the stimulation level while a pulse period, a pulse magnitude and a pulse train duration are fixed. In addition, in U.S. Pat. No. 6,637,376, a pulse train in which a pulse amplitude and a pulse train duration are fixed but the number of pulses included in a certain pulse train duration is changed in proportion to the stimulation intensity or in which the number of pulses is fixed but the separation between pulses is changed is generated (as a result, the duty cycle is changed in proportion to the stimulation intensity). The pulse train generated as above is applied to a transistor which controls a primary current of a transformer, and current flows to the primary side of the transformer during the pulse ON period (duty cycle) to generate electrical impulse stimulation to the secondary side.

U.S. Pat. No. 5,666,908 and U.S. Pat. No. 6,637,376 allow the circuit in the training device to simplify and the number of output pins of the microprocessor to reduce since a D/A converter is not used separately. However, since the configuration for generating a pulse train corresponding to the stimulation level must be provided in the microprocessor, the microprocessor becomes complicated and has a large capacity. In addition, since the intensity (level) of the electric impulse, a stimulus, is not controlled by the magnitude of pulses in the pulse train but controlled by only the pulse ON period, only the time during which the electric impulse of the same intensity continues may be controlled.

Figure 6:
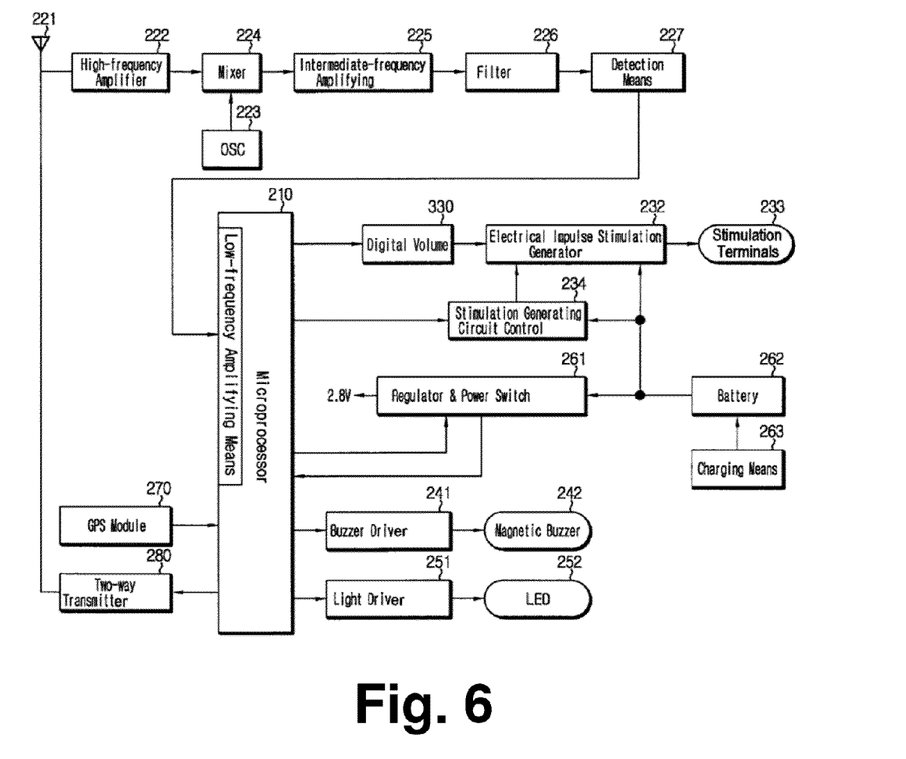
FIG. 6 is a block diagram showing the training device according to a third embodiment.

However, in the third embodiment of the present invention, the level (intensity) of stimulation is controlled in the true sense of the word without using a D/A converter and without increasing the complexity of the microprocessor. For this purpose, in the third embodiment, as shown in FIG. 6, a digitally controllable volume control (hereinafter, referred to as a "digital volume") 330 is used instead of the D/A converter. The digital volume 330 may be implemented with several resistance elements and CMOS switches and may be configured as an integrated circuit chip. The digital volume 330 receives the digital signal representing a stimulation level from the microprocessor 210 and outputs a voltage proportional thereto. In other words, in the words of U.S. Pat. No. 5,666,908 and U.S. Pat. No. 6,637,376, the digital volume 330 outputs a pulse in which the width or number of voltage pulses or the duty cycle is fixed but the pulse amplitude or magnitude is variable. The voltage with a variable magnitude which is an output of the digital volume 330 is intactly applied to a transistor which controls a primary current of a transformer of the electrical impulse stimulation generator to allow the current proportional to the voltage value to flow to the primary side so that the electrical impulse stimulation with a voltage proportional thereto is generated at the secondary side.

The digital volume 330 of this embodiment may be considered as a D/A converter in a broad sense since the input, output and functions of the digital volume 330 are identical to those of the D/A converter 231 of the former embodiments. However, the D/A converter 231 of the former embodiments occupies a plurality of output pins of the microprocessor 210, while the digital volume 330 of this embodiment occupies only a small number of output pins regardless of the number of stimulation levels. Therefore, in this embodiment, it is possible to reduce the capacity and size of the microprocessor which allows the training device 200 worn by an animal to become lighter. For example, in the case where the number of stimulation levels is 256, the D/A converter 231 of the former embodiments occupies eight output pins, while the digital volume 330 of this embodiment occupies only three output pins regardless of the number of stimulation levels.

Figure 7:
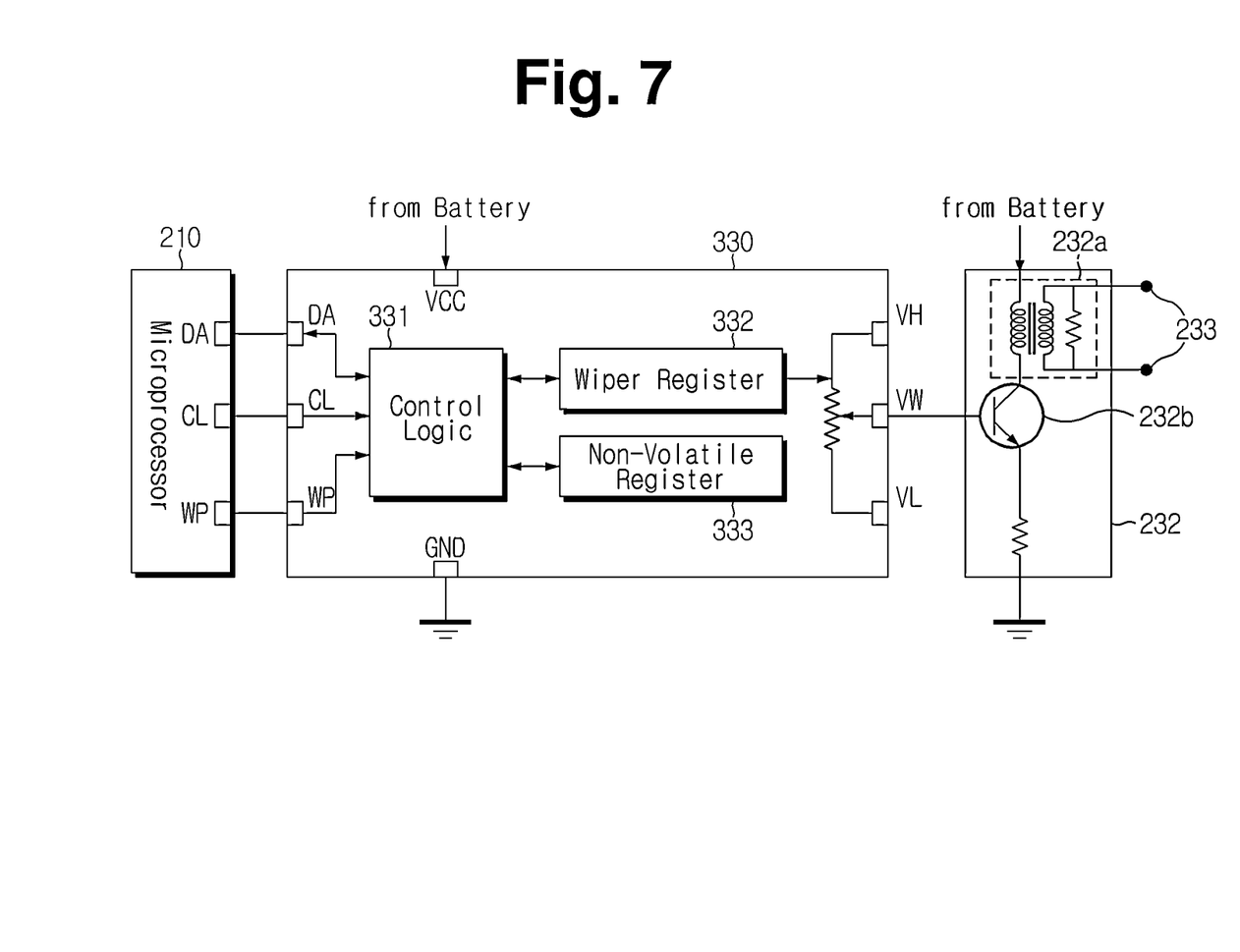
FIG. 7 is a circuit diagram showing a detailed configuration of a digital volume shown in FIG. 6 and relations among the digital volume, a microprocessor and an electrical impulse stimulation generator.

Hereinafter, the third embodiment of the present invention will be described with reference to FIGS. 6 and 7, based on only the components of the training device (receiver) 200, different from those of the former embodiments. In FIG. 6, the component designated by the same reference symbol as in FIGS. 3 and 5 is identical to that of the former embodiment. Meanwhile, only the input and output pins of the microprocessor 210 associated with the digital volume 330 are shown in FIG. 7, and the input and output pins not associated with the digital volume 330 are not shown therein.

330: Digital volume
<Description of Input and Output Pins>
VCC—Power pin
A power is applied from the battery 262 to the power pin VCC, and the power pin VCC supplies the power to a circuit in the digital volume.
GND: Ground pin
DA: Data pin The data pin DA exchanges commands and data (including stimulation level data) with the microprocessor 210 in a serial communication. The commands and data input to or output from the data pin DA include fields for command codes (ID codes) such as writing and reading, address fields designating a register which is a target of each command, and data fields representing a data value (a stimulation level value) to be written in the designated register by the address field. The length (bits) of each field is suitably determined according to the number of command types, the number of registers, and the number of stimulation levels. For example, in the case where the number of stimulation levels is 256, the length of the data field becomes 8 bits.

CL: Clock pin
The clock pin CL provides a basic clock regulating the operation timing of each circuit in the digital volume.
WP: Write protection pin
Writing is allowed in each register of the digital volume only when the write protection pin WP is activated.
VH: High output pin
The high output pin VH outputs a highest voltage value (a voltage value of the power received from the power pin VCC) corresponding to the highest stimulation level.
VL: Low output pin
The low output pin VL outputs a lowest voltage value (typically, 0 V) corresponding to the lowest stimulation level.
VW: Wiper output pin The wiper output pin VW outputs a voltage value corresponding to the stimulation level stored in a wiper register 332. The wiper output pin VW is connected to a base of a transistor 232b which controls a primary current of a transformer 232a of the electrical impulse stimulation generator 232, and current proportional to the output voltage (stimulation level) of the wiper output pin flows to the primary side of the transformer 232a so that a high voltage proportional to the stimulation level is induced to the secondary side of the transformer 232a and is applied to the stimulation terminal 233.

332: Wiper register
The wiper register 332 stores the stimulation level value input through the data pin DA or stored in a non-volatile register 333, and may be implemented as a volatile memory element. The length (bits) of the wiper register is identical to the length of data fields of the commands and data input or output through the data pin DA. The voltage proportional to the stimulation level stored in the wiper register 332 is output from the wiper output pin VW. For example, in the case where the number of stimulation levels is 256 (the length of the wiper register is 8 bits) and the value presently stored in the wiper register is 25, the highest voltage (the voltage of the high output pin VH) is divided by 256 and then the voltage corresponding to the twenty fifth is output through the wiper output pin VW.

333: Non-volatile register
The non-volatile register 333 stores a value stored last in the wiper register 332 when the digital volume 330 or the training device 200 turns off, or stores an initial value (an initial stimulation level value) that needs to load to the wiper register 332 when the digital volume 330 or the training device 200 turns on. In the case where the initial stimulation level value is not specially set or the last value of the wiper register 332 is not stored, or if the wiper register 332 is configured with a non-volatile memory element, the non-volatile register 333 may not be provided.

331: Control logic
The control logic 331 is a logic circuit controlling each component of the digital volume 330. The control logic 331 interprets commands and data input through the data pin DA and reads or writes values of the wiper register 332 or the non-volatile register 333 according to logic values of the clock pin CL and the write protection pin WP.

Meanwhile, though it has been illustrated in the above third embodiment that the training device 200 communicates with the remote controller 100 and applies an electrical impulse stimulation to an animal according to the stimulation level set in the remote controller 100, the training device 200 of the third embodiment may also be used solely without the remote controller 100. In other words, the training device 200 has a sensor for sensing a specific behavior of an animal, which requires correction, for example barking or moving out of a set area, and when such a specific behavior of the animal is sensed by the sensor, the training device 200 may automatically apply a stimulation of a level defined by applying the number or degree of such specific behaviors to a predetermined algorithm. This algorithm may increase the stimulation level as the number or degree of specific behaviors increases, and may decrease or initialize the stimulation level if the specific behavior is not sensed for a predetermined time, in a traditional way. In this case, the remote controller and an antenna and circuits associated for communication with the remote controller are not needed. Instead, a sensor for sensing a specific behavior of an animal is required. In addition, there is a need to program and store the predetermined algorithm in the microprocessor 210 of the training device.

Meanwhile, the animal training system of the present invention may also be configured to train two or more animals simultaneously by using a single remote controller. In other words, the animal training system may include a single remote controller, and two or more training devices capable of communicating with the single remote controller by RF communication, each respectively worn by the animals to be trained. The fourth embodiment is directed to such a system including a single remote controller and a plurality of training devices.

Figure 1:
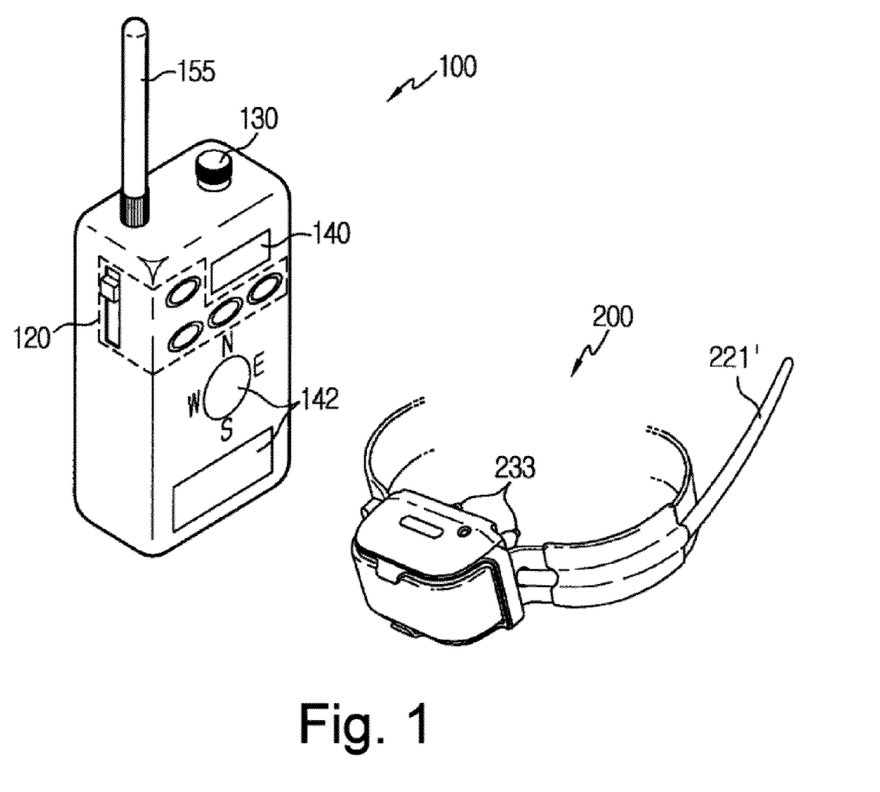
FIG. 1 is a perspective view showing a remote controller and a training device used in a remote animal training system.
Figure 8:
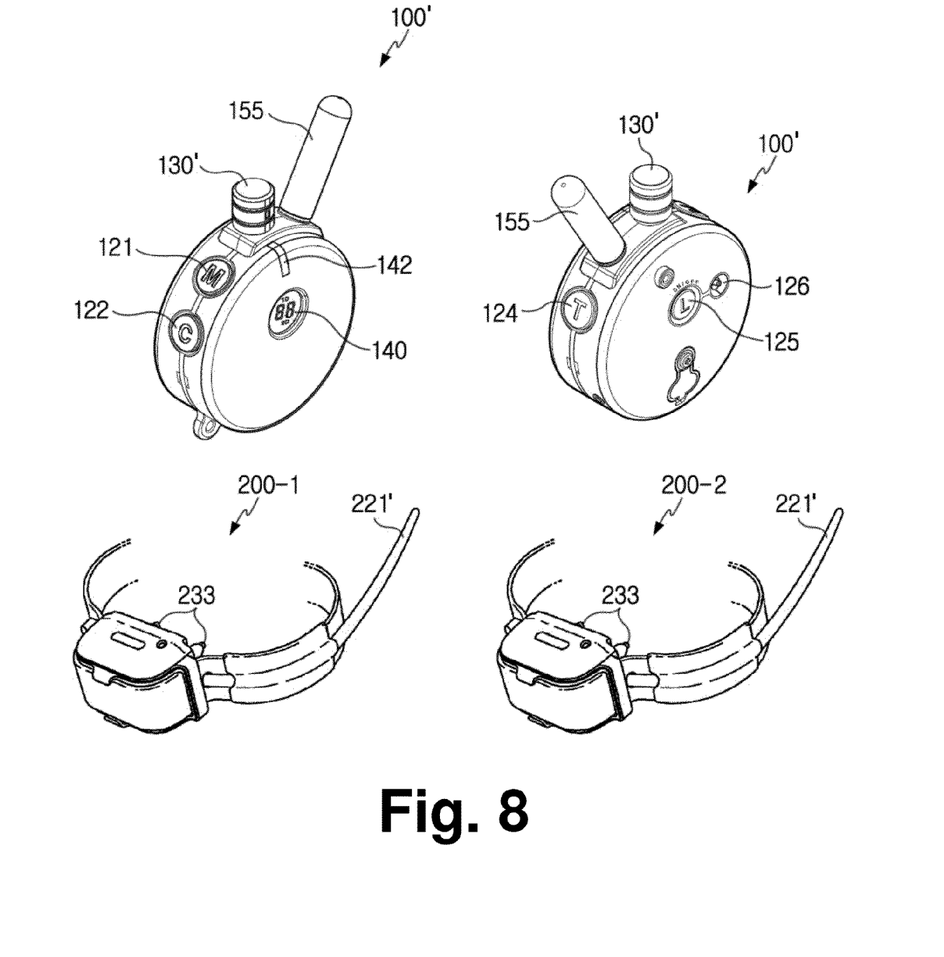
FIG. 8 is a perspective view showing a remote controller and a training device used in a training system according to a fourth embodiment.
Figure 9:
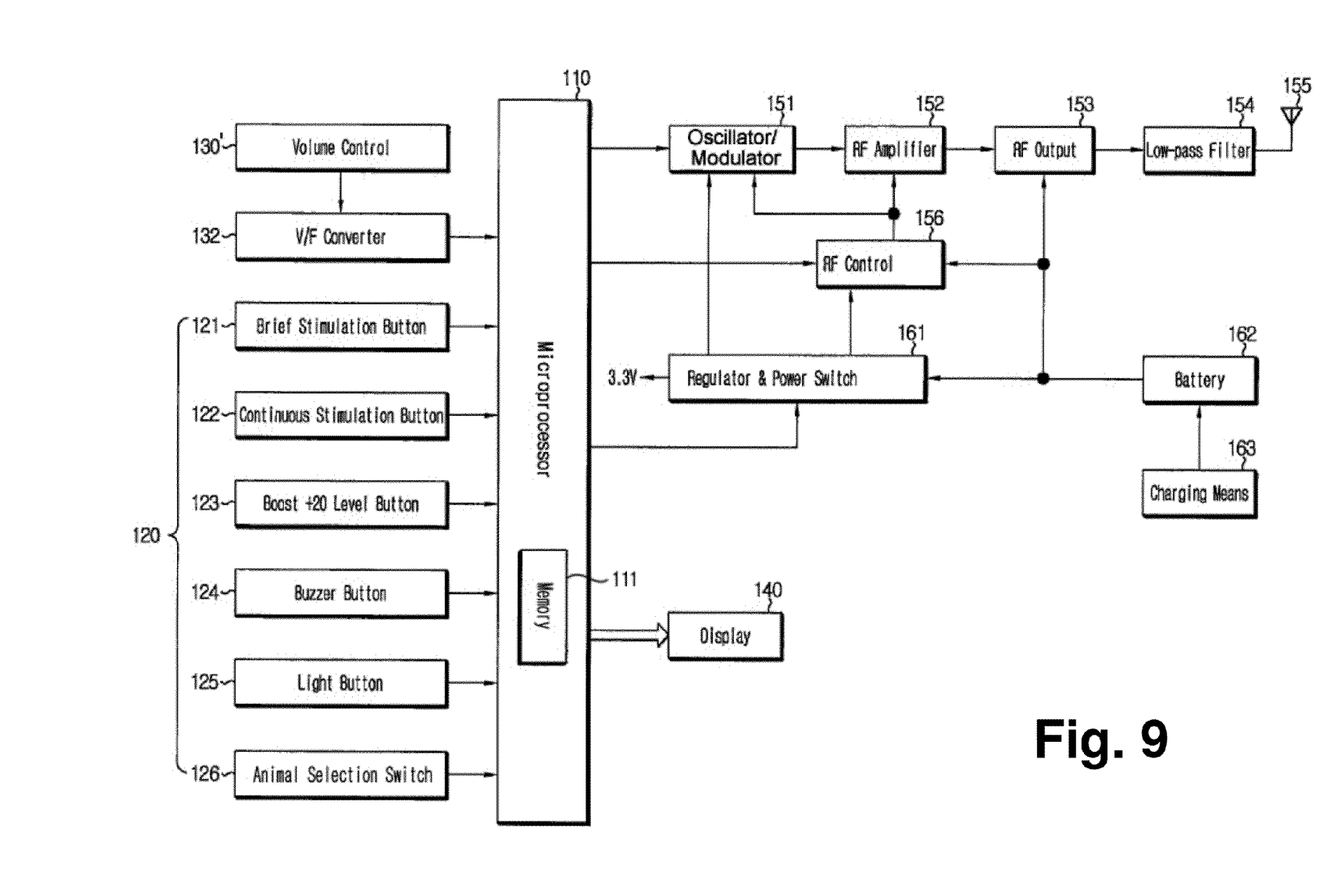
FIG. 9 is a block diagram showing the remote controller circuitry according to the fourth embodiment.
Figure 10:
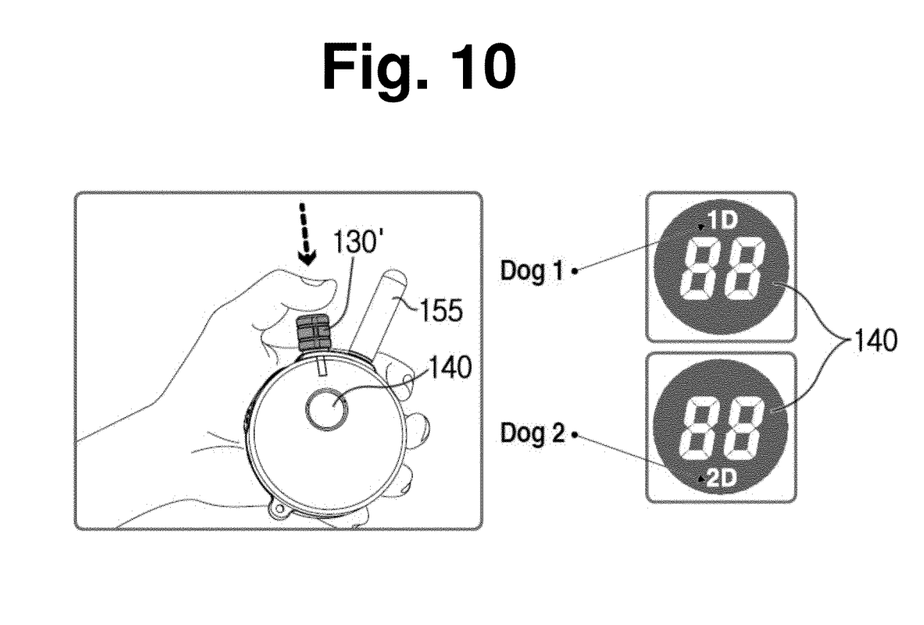
FIG. 10 is a diagram illustrating a process of setting and locking stimulation levels respectively for a plurality of animals according to the fourth embodiment.

Hereinafter, the fourth embodiment of the present invention will be described in detail with reference to FIGS. 8 to 10, based on points that are different from the former embodiments. In FIGS. 8 to 10, the component designated by the same reference symbol as in FIGS. 1 and 2 is identical to that of the former embodiment.

The animal training system of the fourth embodiment includes a single remote controller 100' and two training devices 200-1 and 200-2, as shown in FIG. 8. Even though FIG. 8 is depicted as if two remote controllers 100' are used, only one remote controller 100' is depicted as being observed from different positions. In addition, even though the remote controller 100' of FIG. 8 has a different appearance from the remote controller 100 shown in FIG. 1, the remote controller 100' of FIG. 8 has the same basic functions as the remote controller 100 of FIG. 1 except for some components required for controlling the two training devices 200-1 and 200-2 separately. In addition, each of the two training devices 200-1 and 200-2 is substantially identical to the training device 200 of the former embodiments. Moreover, the above two training devices have the same basic configuration except that they have some different detailed configurations required for selectively responding to the remote controller. Additionally, the above two training devices may be differently marked to be distinguished from each other.

The remote controller 100' of this embodiment includes an animal selection switch 126 for selecting a training device 200-1 and 200-2 (or, an animal) to be controlled (to be trained), which is a big difference from the former embodiments. In other words, a user may select an animal 1 (e.g., dog 1) or an animal 2 (e.g., dog 2) by using the animal selection switch 126 in the form of a toggle switch, and apply a stimulation such as an electric impulse stimulation, a sound stimulation and a light stimulation to the selected animal by the manipulation as in the examples described above.

At this time, the remote controller 100' may be set to use different communication frequencies or different ID codes for the training devices 200-1 and 200-2 in order to control only a selected training device 200-1 or 200-2 (in other words, in order that only a selected training device responds to the control of the remote controller). Accordingly, the training devices 200-1 and 200-2 are configured to communicate with the remote controller 100' by using different corresponding communication frequencies or are endowed with different ID codes.

If the animal training system of this embodiment as described above is used, a plurality of animals may be controlled (trained) by using only one remote controller 100'. However, the plurality of animals controlled (trained) by one remote controller 100' may have different sensitivities against stimulation. For this reason, whenever an animal to be trained changes, the stimulation level applied to the animal should be appropriately adjusted. However, adjusting the stimulation level whenever a selected animal changes is very cumbersome, and in a case where an urgent control is necessary, a user may fluster and not be able to easily adjust the stimulation level suitably.

In this consideration, the animal training system of this embodiment finds and memorizes an appropriate stimulation level of each animal through trial and error, and then, when an animal is selected by the animal selection switch 126, the animal training system automatically sets the stored appropriate stimulation level for the animal. Further, in this embodiment, a locking function and an unlocking function are provided so that the stored appropriate stimulation level for each animal does not change even though a volume control 130' is manipulated.

In detail, the remote controller 100' of this embodiment includes a locking unit for locking the level of presently set electric impulse stimulation so that the level does not change even though the volume control 130' is manipulated. The locking unit includes a storage unit for storing the level of electric impulse stimulation set by the volume control 130', and a locking button configured to be pressed by the user so that the level of electric impulse stimulation set for the training device 200-1 or 200-2 selected by the animal selection switch 126 is stored in the storage unit.

The storage unit may be a memory element 111 provided in the microprocessor 110, as shown in FIG. 9. The memory element 111 may be implemented into a register, and the memory element 111 is preferably a non-volatile memory whose contents do not erase even when the power is off.

In this embodiment, the locking button is not a separate button, and the volume control 130' also functions as the locking button. In other words, the volume control 130' is configured to turn, and the volume control 130' adjusts the level of electric impulse stimulation in proportion to its turning amount and a locking function which is performed when the volume control 130' is pressed along its turning axis (see the arrow in FIG. 10). If the volume control 130' is pressed in its axial direction as described above, the microprocessor 110 stores the level of electric impulse stimulation, presently set by the turning operation of the volume control 130' and displayed at the center of the display 140, in the storage unit 111 as a level of stimulation for the animal presently selected by the animal selection switch 126. After that, even though the volume control 130' is turned, the turning operation is ignored, and the stimulation level does not change. At this time, the display 400 displays the animal whose stimulation level is presently selected, stored and locked (for example, in a case where the stimulation level is locked for Dog 1, an symbol "1D" is displayed, and in a case where the stimulation level is locked for Dog 2, a symbol "2D" is displayed, as shown in FIG. 10) to inform the user of the animal whose stimulation level is locked.

In a state where the appropriate stimulation level for each animal is stored and locked, if an animal selected by the animal selection switch 126 changes, the stimulation level stored for the selected animal is automatically displayed on the display 140. In this state, if the user instantly pushes the stimulation button (for example, the brief stimulation button 121 or the continuous stimulation button 122) without adjusting the stimulation level, the present stimulation level is sent to the selected training device 200-1 or 200-2 and is applied to the selected animal.

Meanwhile, when the level of electric impulse stimulation for a specific animal is in a locked state, if the locking button (or, the volume control 130') is pushed again, the locked state is released. In other words, the microprocessor 110 turns off the symbol ("1D" or "2D" in FIG. 10) showing the selected animal whose stimulation level is stored and locked, and allows the level of electric impulse stimulation to be changed by the turning operation of the volume control 130'.

As described above, the animal training system of this embodiment stores and locks appropriate stimulation levels for a plurality of animals, and therefore it is not necessary to separately adjust the stimulation level even though a selected animal is changed, which allows the user to rapidly and conveniently cope with the change of the selected animal.

Meanwhile, even though it has been described in the fourth embodiment that a user may select one of two animals (in other words, the user may select one of two training devices), the user may select one of three or more animals, not limited to the above.

In addition, even though it has been described in the fourth embodiment that the volume control 130' has a function of the locking button together, the locking button may be provided independently of the volume control 130', not limited to the above.

Further, the first to fourth embodiments may be combined as desired. For example, the stimulation level storing and locking function of the fourth embodiment may be applied to an animal training system having a single remote controller and a single training device. In addition, the 2-way function of the second embodiment may be applied to the third or fourth embodiment, and the digital volume of the third embodiment may be applied to the first, second or fourth embodiment.

Thus, an improved animal training system has been disclosed. While embodiments and applications of this invention have been shown and described, it would be apparent to those skilled in the art that many more modifications are possible without departing from the inventive concepts herein. Therefore, the invention is not to be restricted except in the spirit of the appended claims.

What is claimed is:

1. A remote controller held by a user to remotely control a plurality of training devices respectively worn by a plurality of animals to be trained by radio frequency (RF) communication, the remote controller comprising:
   an animal selection switch for selecting a training device to be controlled from the plurality of training devices;
   a stimulation mode selection button for selecting a kind and mode of stimuli to be applied to the animal, the stimuli including at least an electrical impulse stimulation;
   a single volume control for setting the level of electrical impulse stimulation to be applied to the animal, the volume control including a three-terminal potentiometer;
   a locking unit for locking the level of presently set electric impulse stimulation so that the level does not change even though the volume control is manipulated;
   a RF communication circuitry for transmitting signals including the kind and mode of stimuli and the level of electrical impulse stimulation to the training device through a transmitting antenna; and
   a microprocessor for processing the signals and controlling the locking unit and the RF communication circuitry.

2. The animal training device of claim 1, wherein the locking unit includes:
   a storage unit for storing the level of electric impulse stimulation set by the volume control; and
   a locking button configured to be pressed by the user so that the level of electric impulse stimulation, set by the volume control for the training device selected by the animal selection switch, is stored in the storage unit.

3. The animal training device of claim 2, wherein the volume control is configured to turn so that the level of electric impulse stimulation is set in proportion to a turning amount thereof, and the volume control has a function of the locking button by storing the set level of electric impulse stimulation in the storage unit when the volume control is pressed along a turning axis thereof.

4. The animal training device of claim 2, wherein, in a state where the level of electric impulse stimulation is in a locked state, when the locking button is pressed, the microprocessor releases the locked state to allow the level of electric impulse stimulation to be changed by manipulating the volume control.

5. The animal training device of claim 2, wherein the storage unit is a non-volatile memory whose contents do not erase even when the power is off.

6. The animal training device of claim 1, further comprising a display for displaying the level of electric impulse stimulation set by the volume control.

7. The animal training device of claim 6, wherein the display further displays a symbol of the training device whose level of electric impulse stimulation is in a locked state and the level of electric impulse stimulation in the locked state.

8. The animal training device of claim 1, further comprising a voltage-frequency converter for converting a voltage level set by the volume control to a corresponding frequency signal proportional to the voltage level,
   wherein the microprocessor receives the frequency signal converted by the voltage-frequency converter.

* * * * *